United States Patent [19]

Ungerböck

[11] Patent Number: 5,353,280
[45] Date of Patent: Oct. 4, 1994

[54] FULL-DUPLEX START-UP FOR MODEMS

[75] Inventor: Gottfried Ungerböck, Langnau am Albis, Switzerland

[73] Assignee: International Business Machines, Armonk, N.Y.

[21] Appl. No.: 54,776

[22] Filed: Apr. 27, 1993

[30] Foreign Application Priority Data

Dec. 10, 1992 [EP] European Pat. Off. ......... 92810978.4

[51] Int. Cl.$^5$ ............................................. H04L 29/08
[52] U.S. Cl. ................................. 370/32.1; 375/121
[58] Field of Search ...................... 370/24, 32.1, 84; 375/7, 8, 13, 121; 379/93, 98

[56] References Cited

U.S. PATENT DOCUMENTS

| | | | |
|---|---|---|---|
| 4,680,781 | 7/1987 | Amundson et al. | 375/8 |
| 4,953,210 | 8/1990 | McGlynn et al. | 375/121 |
| 5,023,869 | 6/1991 | Grover et al. | 370/32.1 |
| 5,214,637 | 5/1993 | Sridhar et al. | 370/24 |

FOREIGN PATENT DOCUMENTS 0292691 11/1988 European Pat. Off. .
0364866 3/1990 European Pat. Off. .
0513527 11/1992 European Pat. Off. .

OTHER PUBLICATIONS

IEEE Transactions on Communications vol. 38, No. 5, May 1990, New York, USA: pp. 629-639 CIOFFI "A fast echo canceller initialization method for the CCITT V.32 modem".

*Primary Examiner*—Benedict V. Safourek
*Attorney, Agent, or Firm*—John J. Timar; Edward H. Duffield

[57] ABSTRACT

The start-up time for typical current generation modems for full-duplex data transmission over the Public Switched Telephone Network (PSTN) as specified in CCITT Recommendations V.32 and V.32bis is about 4 to 8 seconds. This invention reduces that start-up time to about 0.5 to 1 second by applying interleaved and overlapping sending and receiving operations of two connected modems, the calling modem and the answering modem. Both modems send and receive simultaneously in a predetermined sequence at different frequency ranges, channel probing tones (e.g. for evaluating the channel bandwidth), repetitive identification messages (e.g. for determining reference times, identifying modulation rates and center frequencies), repetitive response messages (e.g. for transmitting the determined bandwidths and reference times to the other modem and determining round-trip delays), and training sequences (e.g. for determining echoes, frequency shifts, and receiver settings). The modems then transmit data in a full-duplex mode at the modulation rate and center frequency appropriate for the channel and at an initial bit rate. The maximum achievable bit rate may be achieved later during the full-duplex transmission through rate negotiations.

12 Claims, 3 Drawing Sheets

FULL-DUPLEX START-UP FOR MODEMS

FIELD OF INVENTION

The present invention concerns a method for the fast start-up of modems for full-duplex data transmission over the Public Switched Telephone Network (PSTN).

BACKGROUND

A particular type of modems for full-duplex data transmission over the PSTN has been defined in the CCITT Blue Book, published by the CCITT in Geneva, 1989, in Volume VIII, Fasc. VIII.1. The respective Recommendation V.32 is entitled "A family of 2-wire, duplex modems operating at data signalling rates of up to 9600 bit/s for use on the general switched telephone network and on leased telephone-type circuits". In this recommendation, a start-up procedure is described for exchanging signals between a call mode modem and an answer mode modem in order to train the echo cancellers and equalizers of these modems. This procedure is based on sending essential parts of the training signals in a half-duplex manner. The start-up time required for executing this procedure is in the range of 4 to 8 seconds, which is considered too long for many uses. The follow-on Recommentation V.32 bis, published by the CCITT in 1991, describes essentially the same start-up procedure, but allows for higher data rates than V.32.

A method suited for training echo cancellers in full-duplex modems faster than in V.32 modems is described in a publication by J. M. Cioffi: "A Fast Echo Canceller Initialization Method for the CCITT V.32 Modem", IEEE Transactions on Communications, Vol. 38, No. 5, May 1990, pp. 629–638.

Some new aspects of full-duplex modem initialization are presented in a publication by X. Chen at al. entitled "A Full-Duplex Fast Training Algorithm for Simultaneously Estimating Echo and Channel Response", Proceedings SUPERCOMM/ICC '92, Paper 351.1, pp. 1503–1507. A technique for simultaneously estimating the responses of near-end and far-end echo paths and the signal path from the remote modem to the local modem is described. These responses are then used to adjust the echo cancellers and the equalizer. The authors propose to send for this purpose known periodic training sequences. One reason for this is the difficulty for the receiving modem to determine the beginning of a non-periodic training sequence sent by the remote modem. This is one of the problems solved by the present invention.

SUMMARY OF THE INVENTION

The main object of this invention is to provide an initialization procedure for a next generation of modems for the PSTN currently under consideration by CCITT. With the invented start-up procedure the modem initialization can be completed in considerably less time than by presently used procedures. Current generation modems, like V.22 and V.32 modems, operate only at one given modulation rate. The invented procedure accounts for the automatic selection of a most suitable set of modulation and coding parameters for given telephone channel, which will be an important new requirement for the next generation of modems.

Another object is to improve known fast inizialization procedures with respect to their ability to achieve accurate echo canceller and equalizer adjustments.

The invention provides from the beginning of the initialization procedure in an overlapped and interleaved manner an exchange of information necessary for evaluating the transmission channel conditions, chosing appropriate transmission parameters, and adjusting receiver settings. It minimizes handshaking delays which have henceforth contributed significantly to the prolongation of start-up delays. When no significant round-trip delay is involved, the new start-up procedure can lead to full-duplex data transmission within one second after the calling modem responds to the answer tone of the called modem. The modems will then transmit data reliably at the modulation rate and center frequency appropriate for the channel, and at an initial bit rate. The maximum achievable bit rate can be achieved later during full-duplex transmission through rate negotiations in any suitable manner which is not subject of the present invention.

BRIEF DESCRIPTION OF THE DRAWINGS

The principles of an embodiment of the invention are described in the following with reference to drawings. The drawings show.

DETAILED DESCRIPTION OF THE PREFERRED EMBODIMENT

Introduction

Users of V.32 modems consider the start-up time of 4–8 seconds of these modems often as too long. For a faster modem, the achievement of a considerably shorter start-up time is therefore desirable. In this invention, a start-up procedure is proposed, which in the absence of significant round-trip delay can lead to full-duplex data transmission within one second after the call modem responds to the answer tone. The modems will then transmit data with modulation and coding parameters appropriate for the respective directions of transmission, and at safe initial bit rates. The maximum bit rates for reliable data transmission are to be achieved later through rate negotiations, which are beyond the scope of this invention.

General Function

Figure 1:
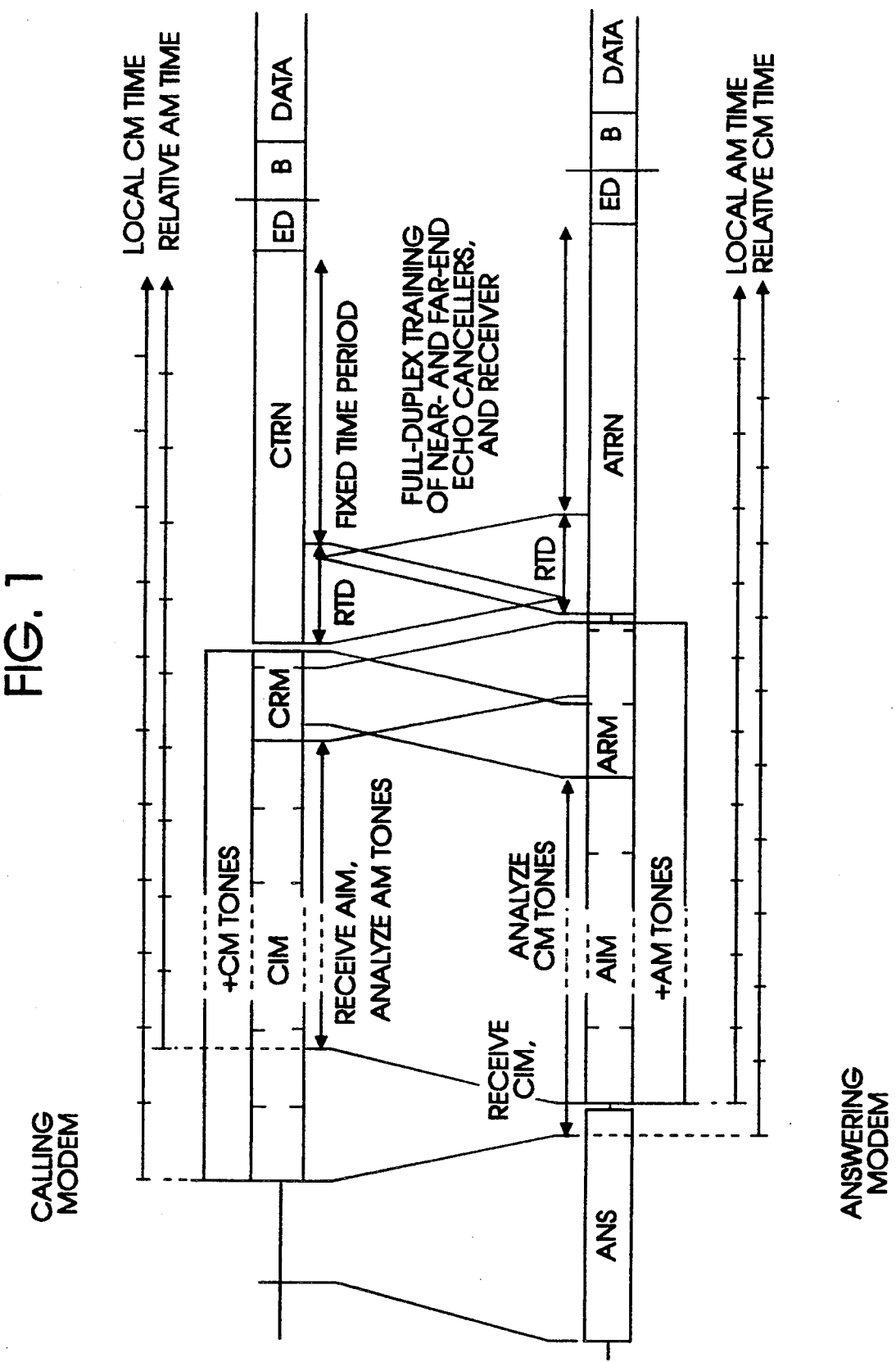
FIG. 1—the start-up procedure for exchanging signals and messages between a calling modem and an answering modem, as provided by the present invention.

The proposed full-duplex start-up procedure is illustrated in FIG. 1. To obtain a short start-up time, channel probing and ranging operations and training of the echo cancellers and receivers are performed simultaneously by both modems. Handshake operations that introduce round-trip delays are kept to a minimum. It is assumed that the calling modem (CM) is connected-to-line when the answering modem (AM) begins sending the answer tone (ANS). It is further assumed that both modems are of a type that can perform the necessary operations.

During the initial probing and ranging phase, the modems exchange identification messages and determine from two sets of simultaneously transmitted tones the most appropriate modulation and coding parameters for subsequent fullband training and data transmission in each channel direction. The results are exchanged between the modems by response messages in a manner which also allows for measuring round-trip delay. During the subsequent training phase, the modems transmit fullband training sequences with the modulation parameters established in the first phase. Each modem estimates simultaneously the responses of the near-end and far-end signal paths, and the signal path from the remote modem. These responses are then used to adjust the echo cancellers and derive with some further processing the remaining receiver settings. Finally, the modems send data at safe initial rates.

The Probing and Ranging Phase

Figure 2:
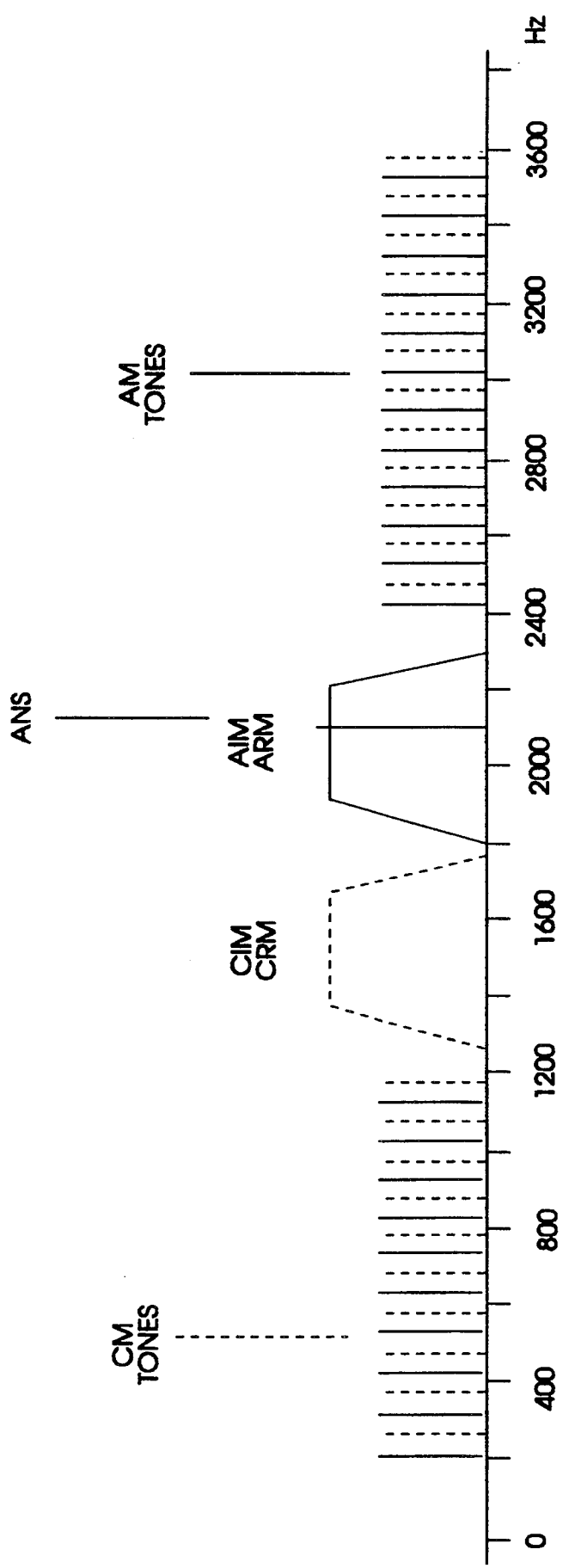
FIG. 2—an example of the spectra of the messages and the channel probing tones exchanged between the modems during the channel probing and ranging phase in the start-up procedure of FIG. 1.

The calling-modem identification message (CIM) and the answering-modem identification message (AIM) are transmitted in the form of two narrowband modulated signals with center frequencies near midband, as indicated in FIG. 2. Scrambled QPSK modulation with a data rate of 800 bit/s is proposed. Alternatively, coded 8-PSK may be employed to increase the robustness of the start-up procedure against noise events. The identification messages (CIM and AIM) consist of repetitively transmitted fixed-length blocks, preferably of 48 bits length, each conveying the following information:

Supported modulation parameters for transmission and reception, i.e. set of modulation rates, center frequencies, preemphasis functions, transmit-power levels (including an indication whether or not different parameters are allowed for transmission and reception).

Supported coding parameters for transmission and reception, i.e. types of modulation codes, data rates, capabilities for precoding and warping.

A block sequence number.

Framing bits to identify CIM or AIM block boundaries, and parity-check bits for error detection.

As indicated in FIG. 1, each modem keeps a local time measured from the beginning of CIM or AIM transmission. By including in the CIM and AIM blocks a sequence number, each modem can establish a relative time of the remote modem, when it first correctly receives a CIM or AIM block.

The calling-modem response message (CRM) and the answering-modem response message (ARM) employ the same modulation as used for the CIM and AIM. The CRM and ARM consist at least of one block, preferably of 48 bits length, conveying the following information:

Selected modulation and coding parameters for subsequent transmission of a training sequence and then data from the remote modem, i.e. modulation rate, center frequency, modulation code, precoding function, preemphasis function, use of warping, transmit power, and initial bit rate.

Measured frequency shift of signals received from the remote modem.

The relative time of the remote modem, when transmission of a CRM or ARM block begins.

Framing bits to identify CRM or ARM block boundaries, and parity-check bits for error detection.

Simultaneously with the modulated narrowband signals, two sets of interleaved tones are transmitted in each channel direction for channel probing, as indicated in FIG. 2. It is proposed to place the CM tones at frequencies $62.5 + k \times 100$ Hz, and the AM tones at frequencies $12.5 + k \times 100$ Hz. If the transmission channels contain elements, which introduce spectral aliasing around a frequency that is a multiple of 100 Hz, e.g. 3200 Hz, then the alias CM and AM tones occur at $37.5 + m \times 100$ Hz and $87.5 + m \times 100$ Hz, respectively. Thus, they do not interfere with the original CM and AM tones.

By analysing the received CM and AM tones, the modems determine the useful bandwidth for full-duplex transmission in both channel directions. In addition, the spectral shape of these channels in the critical bandedge regions and spectral signal-to-noise ratios are estimated. To measure harmonic distortion, one tone in each set of tones can be omitted (not shown in FIG. 2). It may also be possible to estimate harmonic distortion from the errors signals associated with the received CIM or AIM symbols.

The probing and ranging operations are now described in detail.

1. The CM is initially conditioned to detect ANS. When ANS is detected, the CM waits for 0.5 to 1.0 second, according to V.25, to cause disabling of echo suppressors and/or cancellers in the network.

2. Then the CM begins sending CIM blocks and CM tones, and waits for detection of AIM signals or AM tones. Attention is now focussed on the AM. The further operations performed by the CM are similar to those of the AM.

3. While sending ANS, the AM is conditioned to detect reception of CIM signals or CM tones. When this occurs, the AM ceases to send ANS and begins sending AIM blocks and AM tones.

4. When the AM first correctly receives a CIM block, it stores the modulation and coding parameters supported by the CM and establishes from the sequence number in this block the relative CM time. The AM knows, of course, its own supported modulation and coding parameters, and its local AM time.

5. The AM analyses the CM tones to determine appropriate modulation and coding parameters for subsequent fullband transmission from the CM to the AM. The time taken for this analysis is determined only by the AM. Among the modulation and coding parameters commonly supported by both modems, the AM eventually choses one particular parameter set and encodes these parameters in an ARM block, together with the measured frequency shift of the signals received from the CM.

6. The AM then starts sending ARM blocks. At least in the first ARM block, the AM includes the relative CM time perceived by the AM, when it start to transmit this block.

7. The AM stops sending ARM blocks, if it has sent at least one complete ARM block and has received at least one complete CRM block. (In FIG. 1, the AM sends two complete ARM blocks and stops sending a third ARM block, when the first complete CRM block is received. The CM sends only one complete CRM block and then stops sending the second CRM block, when it receives the first ARM block.)

8. The AM now knows the modulation and coding parameters for subsequent fullband transmission to the CM. The AM computes round-trip delay (RTD) from the difference between the local AM time, when it receives the CRM block, and the relative AM time contained in the received CRM block. For this calculation modem internal propagation and processing delays must also be taken into account.

Echo-Canceller and Receiver Training Phase

The calling-modem training sequence (CTRN) and answering-modem training sequence (ATRN) consist of pseudo random symbols transmitted with the modulation parameters indicated to the CM in the ARM, and to the AM in the CRM. Preemphasis, if requested, is used, but precoding, if also requested, is disabled. The training symbols are chosen from a sufficiently large signal constellation comparable in shape and power to the constellation used for subsequent data transmission, but usually with fewer symbols. The training symbols are generated by a scrambler. At the beginning of sending the training sequence, the scrambler is initialized to the state that would have been reached, if training symbols would already have been generated since the beginning of local modem time at the chosen modulation rate with a known initial scrambler state. Since the remote modem knows the relative time of the modem sending the training sequence, it can perform a similar initialization of its scrambler for local reference symbol generation, when the need for knowing the training symbols arises. (There exist also other methods to associate knowledge of time with knowledge of pseudo random training symbols. For example, time can first be expressed in units of modulation intervals and then mapped by a suitable function into symbol indices, in a manner similar to encryption.)

Again, the operations performed by the CM and AM are similar. The following description is given for the CM.

1. After stopping sending CRM, the CM waits for a short guard interval. Then the CM starts sending the CTRN with the scrambler initialized according to local CM time as described above.

2. After one round-trip delay (RTD0, the CM continues to send the CTRN for a fixed period of time. During this time, the CM receives a stationary composite signal consisting of three signals: near-end echo, far-end echo, and the signal received from the AM. These component signals are caused by the known CTRN symbols without and with RTD, and the ATRN symbols which can locally be regenerated as described above. From the frequency-shift measurements exchanged between the modems, the CM knows also the frequency shifts of the ATRN signals and the far-end echo.

3. The CM has to determine jointly the responses of the near-end and far-end echo paths and the signal path from the AM to the CM. These responses can be obtained by known fast channel-estimation algorithms within a time period, which is a small multiple of the sum of the time spans of the three responses.

4. The estimated responses of the echo paths are then used to adjust the near-end and far-end echo cancellers. Some further processing is needed to determine the remaining receiver settings, e.g. the coefficients of a linear equalizer, in the simplest case. The CM can now decode further received training symbols.

5. The CM transmits an ending delimiter (ED). The ED consists of a distinctive pattern of training symbols, e.g., sign-inverted symbols of the continued CTRN, that mark the end of transmission of symbols from the constellation of training symbols. Thereafter, the CM starts sending scrambled data using the full set of modulation and coding parameters received earlier from the AM. First, a block of scrambled all-one bits (B) is transmitted. Then user data are transmitted.

6. After receiving a similar ED from the AM, the CM conditions its receiver to decode scrambled data according to the full set of modulation and coing parameters, which the CM has sent earlier to the AM. When a sufficient number of scrambled all-one bits has been received, the receiver starts to output decoded user bits.

This completes the description of the essential concepts of the start-up procedure.

Estimate of Start-Up Time

Given below are approximate numbers for the time from the beginning of CIM transmission to the beginning of data transmission by the CM.

| | | |
|---|---|---|
| 1. | Start of CIM to detection of AIM | 130 ms + RTD |
| 2. | Receive AIM, analyse AM tones (5 blocks @ 48 bits at 800 bit/s) | 300 ms |
| 3. | Send CRM (1 block @ 48 bits at 800 bit/s) | 60 ms |
| 4. | Send CTRN and perform full-duplex training (RTD + 512 T at 3000 Baud) | 171 ms + RTD |
| 5. | Send ED and B (8 + 64 T at 3000 Baud) | 24 ms |
| | Total from start of CIM to sending DATA for the CM | 685 ms + 2 RTD |

Rate Requests

Figure 3:
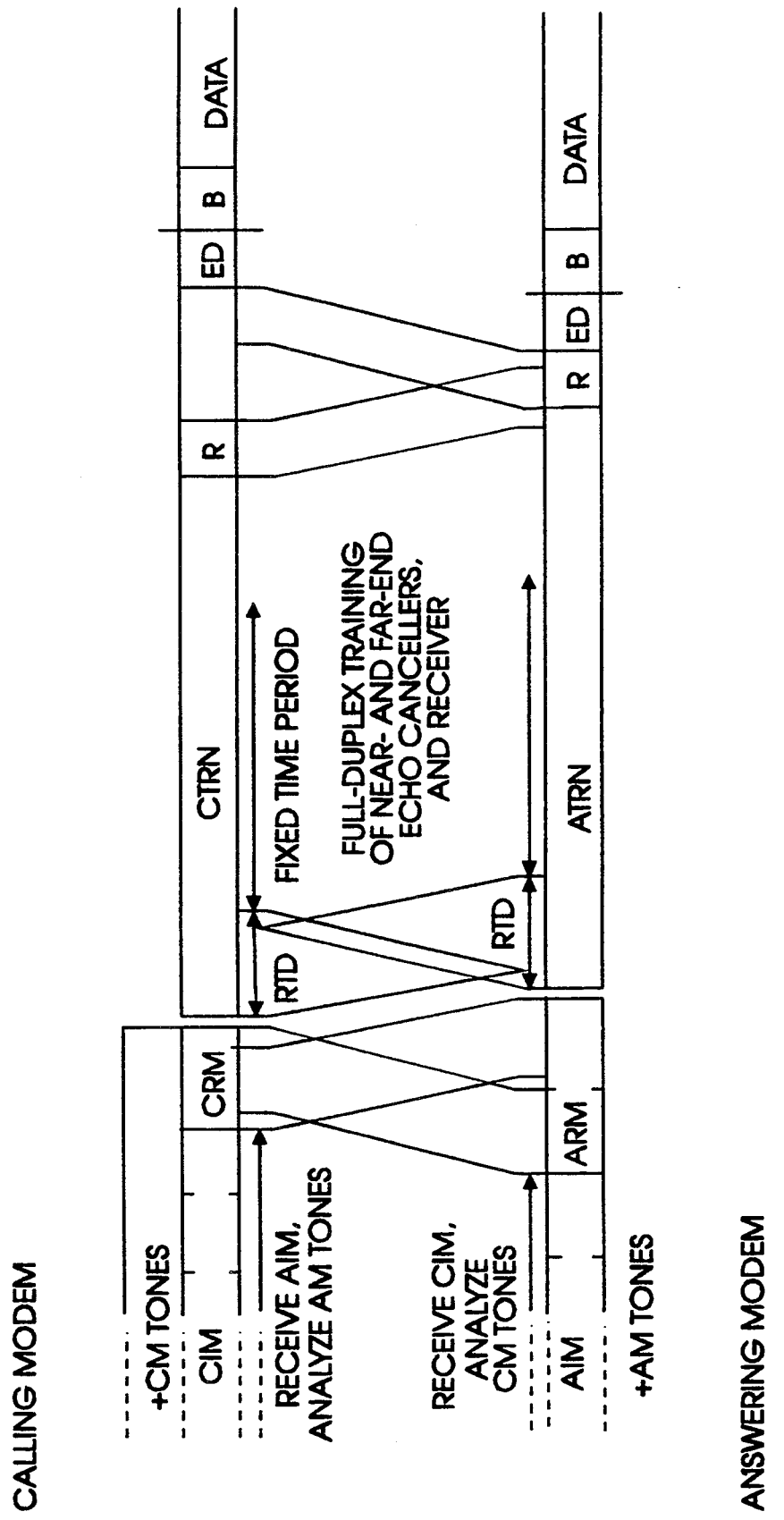
FIG. 3—an extended version of the start-up procedure of FIG. 1 with additional rate-request messages exchanged between the modems before data transmission.

In the proposed start-up procedure so far described, the initial bit rates for data transmission by the CM and the AM are already determined during the probing and ranging phase and communicated to these modems in the ARM and CRM blocks, respectively. It may be advantageous to decide on these rates at the end of the training phase, at the expense of prolonging the start-up time by at least one RTD. FIG. 3 illustrates the sending of rate requests (R). The R expresses the bit rate that a modem decides to be appropriate for reception when it has evaluted the quality of signal reception during reception of further symbols from the training-symbol constellation. The other modem will respond with ED, when it has received R and also sent a corresponding R.

The use of rate requests may be further extended to require from the remote modem a particular use of precoding and warping, and/or a change in transmit power. The ED may be expanded to indicate and thereby confirm explicity some of the modulation and coding parameters that will be used for subsequent data transmission.

I claim:

1. A method of starting full-duplex communication between a first station with a calling modem and a second station with an answering modem, the answering modem, when called, sending an answering tone to the calling modem, the method comprising the following steps:
   a1. sending from each of the modems (a sending modem) to the other modem (a receiving modem), intermittently and repetitively:
      a set of channel probing tones at predetermined frequencies, and
      repetitive identification messages in a given frequency range, containing the sending modem's local time when the message is sent, and characterizing the sending modem by its capabilities in terms of parameters including supported modulation rates, center frequencies, and supported coding;

a2. at the receiving modem receiving said probing tones and identification messages:

establishing a running time reference from the sending modem's local time received in said identification message(s), and determining transmission channel characteristics, in particular determining a useful bandwidth from said received probing tones;

b1. sending from the receiving modem:

repetitive response messages, each containing the running time reference at said receiving modem and transmission parameters selected from the parameters supported by both modems, based on the determined channel characteristics, in particular the modulation rate and center frequency, for subsequent transmission of training and data signals from the sending modem receiving said particular response message;

at the sending modem receiving said response message:

determining the round trip delay by comparing the running time reference and the actual local time at the sending modem;

extracting the information on the transmission parameters to be used for subsequent transmission of training and data signals to the receiving modem sending said response message;

c1. sending from each modem, at the respective determined transmission parameters, full-band training sequences;

c2. determining, at each modem that now sends and receives training sequences, the responses of the respective detected near-end and far-end echo paths and of the signal paths from the other modem to adjust receiver settings, in particular echo cancellors and equalizers as necessary for subsequent data transmission.

2. The method of claim 1, wherein the calling modem, after detecting the answering tone, waits for a predetermined time and then sends the calling modem identification message in a first frequency range and the channel probing tones at given frequencies of a first set, correspondingly, when the answering modem, which is conditioned to receive said calling modem identification message, detects the latter, it stops sending said answering tone and starts transmitting the answering modem identification message in a second frequency range and the respective channel probing tones at given frequencies of a second set.

3. The method of claim 1 or 2, wherein said identification messages consist of repetitively transmitted blocks conveying at least information on:

modulation rates, center frequencies, and data rates, at which the sending modem sending said identification message can operate, elapsed time since the beginning of said identification message transmission, allowing the receiving modem to establish the running time reference, block boundaries and error detection.

4. The method of claim 2, wherein the answering modem recognizes from at least one of said calling modem identification messages the capabilities of the calling modem, establishes the calling modem reference time, and analyzes the calling modem channel probing tones to determine appropriate modulation and coding parameters for transmission from the calling modem to the answering modem, correspondingly, the calling modem recognizes from at least one of said answering modem identification messages the capabilities of the answering modem, establishes the answering modem reference time, and analyzes the answering modem channel probing tones to determine appropriate modulation and coding parameters for transmission from the answering modem to the calling modem, each modem stops sending identification messages and starts transmitting response messages upon successful reception of an identification message from the other modem, and completed analysis of the channel characteristics, and, finally, each modem stops transmitting response messages upon transmission of at least one complete response message, and successful reception of at least one response message.

5. The method of claim 1 or 4, wherein the response messages consist of repetitively transmitted blocks conveying at least information on:

selected modulation and coding parameters for subsequent transmissions, in particular modulation rate, center frequency, transmit power, type of coding, and initial bit rate, the sending modem reference time, when such sending modem response message block is transmitted, to be used to determine round-trip delay, block boundaries and error detection.

6. The method of claim 1 wherein, subsequent to the response message, each modem transmits the training sequence for the duration of the determined round-trip delay plus a fixed time period, each modem determines, the necessary, channel responses, and receiver settings from a received stationary composite signal comprising near-end echo, far-end echo, and the training sequence from the other modem, and each modem is then ready for transmitting an ending delimiter indicating the end of transmission of training signals to the other modem and conditioned to receive such a delimiter from the other modem.

7. The method of claim 1, wherein the identification messages and the response messages are transmitted in the form of a narrow-band modulated signal with a center frequency near mid-band of the transmission channel bandwidth, in particular with differing mid-frequencies for each modem.

8. The method of claim 1, wherein the identification message has a block length of about 32 bits or more.

9. The method of claim 1, wherein the frequencies of the channel probing tone sets are selected outside the frequency range of the identification messages, in particular towards both ends of the transmission channel bandwidth.

10. The method of claim 9, wherein one set of probing tones is placed at frequencies of $12.5 + k \times 100$ Hz and the other set is placed at $62.5 + k \times 100$ Hz, k being the ordinal number of the respective probing tone.

11. The method of claim, wherein the training sequences consist of a sequence of pseudo-random modulation symbols uniquely associated with time, generated by a scrambler which is initialized at the start of the sending modem's first identification message, such that the receiving modem can identify the transmitted modulation symbols by referring to the modem's running time reference at the receiving modem, as communicated in the identification message.

12. The method of claim 11, wherein the modulation parameters of the training sequences are uniquely determined by the information contained in the response messages.

* * * * *